United States Patent
Gill

(10) Patent No.: US 7,851,785 B2
(45) Date of Patent: Dec. 14, 2010

(54) MAGNETIC TUNNEL TRANSISTOR WITH THIN READ GAP FOR HEAD APPLICATIONS

(75) Inventor: Hardayal Singh Gill, Palo Alton, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1203 days.

(21) Appl. No.: 11/350,226

(22) Filed: Feb. 8, 2006

(65) Prior Publication Data

US 2007/0183100 A1      Aug. 9, 2007

(51) Int. Cl.
    *H01L 29/08*      (2006.01)
(52) U.S. Cl. ................. 257/29; 257/295; 257/E21.208; 360/324.2
(58) Field of Classification Search .............. 257/29, 257/E21.208
    See application file for complete search history.

(56) References Cited

U.S. PATENT DOCUMENTS

| | | | |
|---|---|---|---|
| 5,291,274 A | 3/1994 | Tamura | 257/30 |
| 6,480,365 B1 | 11/2002 | Gill et al. | 360/324.11 |
| 6,671,141 B2 * | 12/2003 | Shimazawa et al. | 360/324.2 |
| 7,259,942 B2 * | 8/2007 | Childress et al. | 360/324.12 |
| 7,453,084 B2 * | 11/2008 | Nowak et al. | 257/30 |
| 2003/0214004 A1 | 11/2003 | Sato et al. | 257/427 |
| 2004/0218314 A1 | 11/2004 | Gill | 360/324.2 |
| 2004/0229430 A1 * | 11/2004 | Findeis et al. | 438/257 |
| 2005/0225905 A1 | 10/2005 | Tera et al. | 360/324.2 |
| 2005/0226043 A1 | 10/2005 | Parkin et al. | 365/173 |
| 2006/0256484 A1 * | 11/2006 | Sato et al. | 360/324.2 |
| 2008/0138660 A1 * | 6/2008 | Parkin | 428/812 |

FOREIGN PATENT DOCUMENTS

EP      1737055 A1 * 12/2006

OTHER PUBLICATIONS

Lee et al.,"Large Magnetocurrents in Double-barrier Tunneling Transistors", Journal of Magnetism and Magnetic Materials, Feb. 2005, vol. 286, p. 138-41.*
Akerman et al.,"Criteria for Ferromagnetic-Insulator-Ferromagnetic tunneling", Journal of Magnetism and Magnetic Materials, Feb. 2002, vol. 240, No. 1-3, p. 86-91.*

* cited by examiner

*Primary Examiner*—Kenneth A Parker
*Assistant Examiner*—Jose R Diaz
(74) *Attorney, Agent, or Firm*—John L. Rogitz

(57) ABSTRACT

A magnetic tunnel transistor (MTT) for a disk drive read head includes a barrier of TiO disposed between a ferromagnetic collector and a ferromagnetic base for preferentially selecting only "hot" electrons for propagation to the collector.

11 Claims, 1 Drawing Sheet

MAGNETIC TUNNEL TRANSISTOR WITH THIN READ GAP FOR HEAD APPLICATIONS

FIELD OF THE INVENTION

The present invention generally relates to magnetic tunnel transistors (MTT) for, e.g., disk drive read heads.

BACKGROUND OF THE INVENTION

In magnetic disk drives, data is written and read by magnetic transducers called "heads." The magnetic disks are rotated at high speeds, producing a thin layer of air called an air bearing surface (ABS). The read and write heads are supported over the rotating disk by the ABS, where they either induce or detect flux on the magnetic disk, thereby either writing or reading data. Layered thin film structures are typically used in the manufacture of read and write heads. In write heads, thin film structures provide high area density, which is the amount of data stored per unit of disk surface area, and in read heads they provide high resolution.

The present invention is directed generally to devices that can be used, in some implementations, as heads for disk drives, and more particularly the present invention is directed to magnetic tunnel transistors (MTT). A magnetic tunnel transistor (MTT) includes a ferromagnetic emitter, such as cobalt Iron (CoFe), a tunnel barrier, a single ultrathin ferromagnetic base layer, and a collector that heretofore has been made of GaAs.

As recognized herein, the use of GaAs as a collector is not as compatible in read head sensor applications as might be hoped. The present invention understands that preferably, only so-called "hot" electrons, also referred to as "ballistic" electrons, tunnel from the emitter through the base to the collector, because such electrons advantageously do not undesirably scatter. It is thus desirable to preferentially select "hot" electrons and to de-select lower energy electrons. With these recognitions in mind, the invention herein is provided.

SUMMARY OF THE INVENTION

A read head for a disk drive includes a magnetic tunnel transistor (MTT) that has a barrier of TiO disposed between a ferromagnetic collector and a ferromagnetic base.

In another aspect, a magnetic tunnel transistor (MTT) has a ferromagnetic base, a ferromagnetic emitter structure, and a ferromagnetic collector that does not include GaAs. A barrier layer of TiO may be disposed between the collector and the base.

In non-limiting implementations a barrier layer of MgO can be disposed between the base and the emitter structure. The collector may be made of NiFe and/or CoFe, the base may be made of CoFeB, and the emitter structure can include a layer of Ru disposed between a layer of CoFeB and a layer of CoFe. The emitter structure can be pinned if desired by a pinning layer.

In yet another aspect, a magnetic tunnel transistor (MTT) includes a ferromagnetic base, a ferromagnetic emitter structure, and a ferromagnetic collector. A barrier layer is between the collector and base. The barrier layer has a barrier height of less than three-tenths of an electron volt. The barrier layer may be, e.g., TiO.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
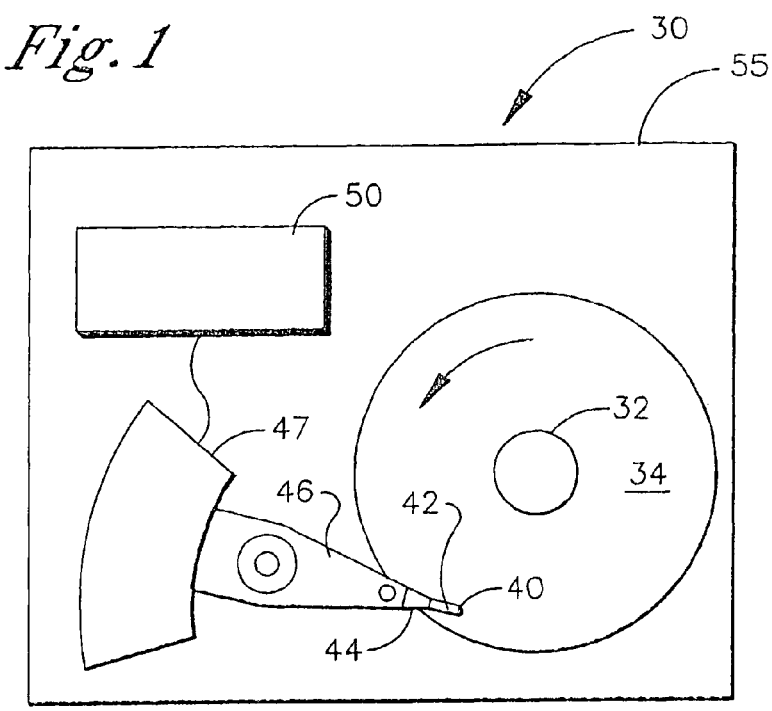
FIG. 1 is a schematic plan view of a hard disk drive, showing one non-limiting environment for the present invention.

Referring initially to FIG. 1, a magnetic disk drive 30 includes a spindle 32 that supports and rotates a magnetic disk 34. The spindle 32 is rotated by a spindle motor that is controlled by a motor controller which may be implemented in the electronics of the drive. A slider 42 has a combined read and write magnetic head 40 and is supported by a suspension 44 and actuator arm 46 that is rotatably positioned by an actuator 47. The read head portion may be a MTT described below. It is to be understood that a plurality of disks, sliders and suspensions may be employed. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin cushion of air known as the air bearing that exists between the surface of the disk 34 and an air bearing surface (ABS) of the head. The magnetic head 40 may then be employed for writing information to multiple circular tracks on the surface of the disk 34, as well as for reading information therefrom. To this end, processing circuitry 50 exchanges signals, representing such information, with the head 40, provides spindle motor drive signals for rotating the magnetic disk 34, and provides control signals to the actuator for moving the slider to various tracks. The components described above may be mounted on a housing 55.

Figure 2:
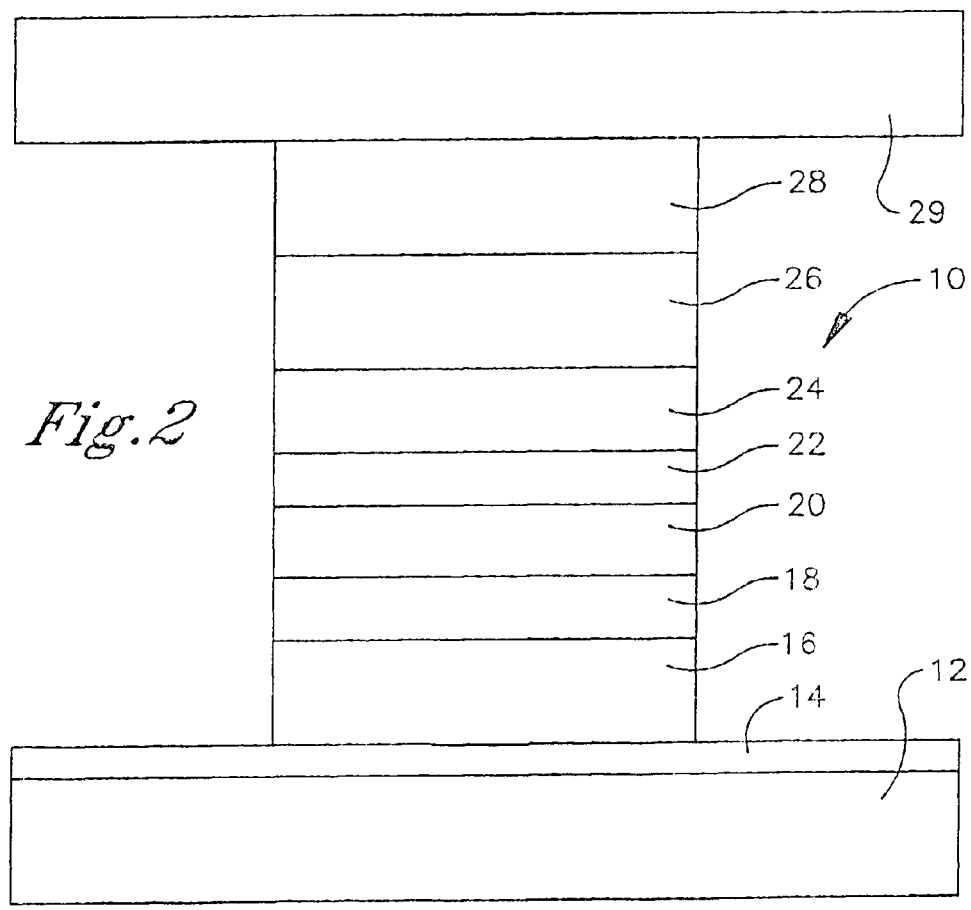
FIG. 2 is an elevational view of a MTT in accordance with present principles.

Now referring to FIG. 2, the present read head, generally designated 10, includes a ferromagnetic collector 12, designated "S1" in FIG. 2, that may be made of, e.g., NiFe or CoFe. Laying against the collector 12 is a first barrier layer 14 made of TiO and having a barrier height of one-tenth to three-tenths (0.1-0.3) electron-volts (ev).

A ferromagnetic base 16 lies against the first barrier layer 14 as shown. In one implementation the base 16 is made of CoFeB. A second barrier layer 18 lies against the base 16. The second barrier layer 18 may be, e.g., MgO and in non-limiting implementations may have a thickness of twenty Angstroms and a barrier height of four-tenths of an electron volt (0.4 ev).

A stack of layers that establishes a ferromagnetic emitter is on the second barrier layer 18. More specifically, a non-limiting CoFeB layer 20 lies against the second barrier layer 18, a non-limiting Ru layer 22 can lie on the CoFeB layer 20, and a non-limiting CoFe layer 24 can lie on the Ru layer 22. If it is desired to pin the emitter, a pinning layer 26 that can be, e.g., IrMn, can be deposited on the CoFe layer 24. A protective cap 28 such as but not limited to Ta can be on the pinning layer 26, and a shield 29, designated "S2" in FIG. 2, can be on the cap 28.

The above structure may be established by deposition, etching, and milling processes known in the art. The external connections to the base, emitter, and collector are effected in accordance with principles known in the art and are omitted for simplicity.

The above structure, owing at least in part to the TiO barrier layer 14, advantageously permits hot electrons to tunnel through the second barrier layer 18, while screening out lower energy electrons that otherwise may undesirably scatter.

While the particular MAGNETIC TUNNEL TRANSISTOR WITH THIN READ GAP FOR HEAD APPLICATIONS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A magnetic tunnel transistor (MTT) comprising:
   a ferromagnetic base;
   a ferromagnetic emitter structure;
   a ferromagnetic collector that does not include GaAs; and
   a barrier layer of TiO disposed between the collector and the base, wherein the emitter structure includes a layer of Ru disposed between a layer of CoFeB and a layer of CoFe.

2. The MIT of claim 1, comprising a barrier layer of MgO disposed between the base and the emitter structure.

3. The MTT of claim 1, wherein the collector is made of NiFe and/or CoFe.

4. The MTT of claim 1, wherein the base is made of CoFeB.

5. The MTT of Claim 1, wherein the emitter structure is pinned by a pinning layer.

6. A magnetic tunnel transistor (MTT) comprising:
   a ferromagnetic base;
   a ferromagnetic emitter structure;
   a ferromagnetic collector;
   a barrier layer between the collector and base and having a barrier height of less than three-tenths of an electron volt; and
   a barrier layer of MgO disposed between the base and the emitter structure, wherein the emitter structure includes a layer of Ru disposed between a layer of CoFeB and a layer of CoFe.

7. The MTT of claim 6, wherein the bather layer is made of TiO.

8. The MTT of Claim 6, wherein the collector does not include GaAs.

9. The MTT of Claim 6, wherein the collector is made of NiFe and/or CoFe.

10. The MTT of Claim 6, wherein the base is made of CoFeB.

11. The MTT of Claim 6, wherein the emitter structure is pinned by a pinning layer.

* * * * *